(12) United States Patent
Yoo et al.

(10) Patent No.: US 10,187,330 B2
(45) Date of Patent: Jan. 22, 2019

(54) HIGH-SPEED PACKET PROCESSING SYSTEM AND CONTROL METHOD THEREOF

(71) Applicant: Korea University Research and Business Foundation, Seoul (KR)

(72) Inventors: Hyuck Yoo, Seoul (KR); Cheolho Hong, Belfast (GB); Kyoungwoon Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 80 days.

(21) Appl. No.: 15/595,150

(22) Filed: May 15, 2017

(65) Prior Publication Data

US 2018/0131641 A1 May 10, 2018

(30) Foreign Application Priority Data

Nov. 10, 2016 (KR) ........................ 10-2016-0149422

(51) Int. Cl.
*H04L 12/54* (2013.01)
*H04W 88/02* (2009.01)
(Continued)

(52) U.S. Cl.
CPC ........ *H04L 49/9068* (2013.01); *H04L 47/621* (2013.01); *H04L 49/9005* (2013.01);
(Continued)

(58) Field of Classification Search
CPC ..... H04L 12/54; H04L 12/56; H04L 12/5602; H04L 49/90; H04L 49/9005;
(Continued)

(56) References Cited

U.S. PATENT DOCUMENTS 9,740,541 B2 * 8/2017 Takada ................ G06F 11/3409
2006/0083246 A1 4/2006 Minami et al.
(Continued)

FOREIGN PATENT DOCUMENTS

JP 2009278364 A 11/2009
KR 20040073856 A 8/2004
(Continued)

*Primary Examiner* — Afsar M Qureshi
(74) *Attorney, Agent, or Firm* — Fox Rothschild LLP

(57) ABSTRACT

A high-speed packet processing system and a method of controlling the system are disclosed. The high-speed packet processing system includes: a network interface card configured to receive or transmit packets; a memory which is accessible by an operating system, and which includes at least one or more data buffers and a single dedicated head (dedicated skb) decoupled from the data buffers, where the data buffers are pre-allocated in correspondence to the packets to allow storing of the packets, and the single dedicated head is connected to the data buffers sequentially in correspondence to the packets; and a packet processing unit configured to sequentially connect the single dedicated head with the data buffers and store the packets sequentially in the data buffers corresponding to reception (Rx) descriptors based on the reception (Rx) descriptors designated in correspondence to the packets, when the packets are received.

9 Claims, 4 Drawing Sheets

(51) Int. Cl.
*H04L 12/861* (2013.01)
*H04L 12/863* (2013.01)
*H04L 12/883* (2013.01)

(52) U.S. Cl.
CPC .......... *H04L 49/9021* (2013.01); *H04L 12/56* (2013.01); *H04W 88/02* (2013.01)

(58) Field of Classification Search
CPC ............. H04L 49/9026; H04L 49/9021; H04L 49/9068; H04L 47/60; H04L 47/62; H04L 47/621; H04W 88/00; H04W 88/02; H04W 88/08
See application file for complete search history.

(56) References Cited

U.S. PATENT DOCUMENTS

| | | | |
|---|---|---|---|
| 2006/0083248 A1* | 4/2006 | Huang | H04L 29/12216 370/395.52 |
| 2009/0182835 A1* | 7/2009 | Aviles | G06F 12/0813 709/213 |
| 2013/0160122 A1* | 6/2013 | Choi | H04L 63/1416 726/23 |
| 2014/0016648 A1* | 1/2014 | Hidaka | H04L 49/15 370/400 |

FOREIGN PATENT DOCUMENTS

| KR | 20090064249 A | 6/2009 |
|---|---|---|
| KR | 20130068631 A | 6/2013 |
| KR | 101328621 B1 | 11/2013 |

* cited by examiner

HIGH-SPEED PACKET PROCESSING SYSTEM AND CONTROL METHOD THEREOF

CROSS-REFERENCE TO RELATED APPLICATIONS

This application claims the benefit of Korean Patent Application No. 10-2016-0149422, filed with the Korean Intellectual Property Office on Nov. 10, 2016, the disclosure of which is incorporated herein by reference in its entirety.

BACKGROUND

Technical Field

The present document relates to a high-speed packet processing system and a method of controlling the high-speed packet processing system.

Description of the Related Art

Packet processing in an existing operating system may require allocating or freeing memory for every received packet, and as each packet is processed sequentially, large amounts of CPU (central processing unit) and memory resources and time may be required in processing a packet. Also, due to various unnecessary processes involved in transmitting the packets, there may be a drastic lowering of performance when applied to a high-speed (e.g. 10 Gbps) network.

Various techniques were proposed for improving this low packet processing performance in the existing operating system, but with these techniques, the increased speed in packet processing comes at the cost of a considerable amount of CPU and memory resources.

SUMMARY

The present document relates to a high-speed packet processing system and a control method for the system which can improve the efficiency of packet processing by using at least one or more data buffers that are pre-allocated in correspondence to the packets and a single dedicated head (dedicated skb) that is decoupled from the data buffers and is connected sequentially to the data buffers in correspondence to the packets.

In some scenarios, the present solution provides a high-speed packet processing system that includes: a network interface card configured to receive or transmit packets; a memory which is accessible by an operating system, and which includes at least one or more data buffers and a single dedicated head (dedicated skb) decoupled from the data buffers, where the data buffers are pre-allocated in correspondence to the packets to allow storing of the packets, and the single dedicated head is connected to the data buffers sequentially in correspondence to the packets; and a packet processing unit configured to sequentially connect the single dedicated head with the data buffers and store the packets sequentially in the data buffers corresponding to reception (Rx) descriptors based on the reception (Rx) descriptors designated in correspondence to the packets, when the packets are received.

In those or other scenarios, the present solution provides a method of controlling a high-speed packet processing system that includes: a first step of receiving packets by way of a network interface card; and a second step of storing the packets sequentially in at least one or more pre-allocated data buffers, which form a memory, in correspondence to the packets in an operating system area by way of a packet processing unit.

As described above, in an existing operating system, memory may have to be allocated or freed whenever a packet is received, and subsequent packets may have to wait until the processing of one packet is finished, so that when a large amount of packets are received, it is difficult to process the packets all at once. A high-speed packet processing system resolves this problem by utilizing fixed memory for processing the received packets and utilizing multiple fixed memory units to allow a simultaneous processing of several packets, to thereby maximize the efficiency of the packet processing.

Also, whereas existing methods for high-speed packet processing use a polling method and require a large amount of memory for fast packet processing, the high-speed packet processing system uses one memory unit consistently for packet processing, so that even if the number of packets requiring processing is increased, the required memory is not increased. Also, by utilizing the NAPI (new API) method of the existing operating system, instead of a polling method, to use the central processing unit only when packets are received, it is possible to minimize the memory required for packet processing and reduce the time when processing by the central processing unit is needed, to thereby effectively reduce the use of resources for packet processing.

Additional aspects and advantages of the present invention will be set forth in part in the description which follows, and in part will be obvious from the description, or may be learned by practice of the invention.

DETAILED DESCRIPTION

Figure 1:
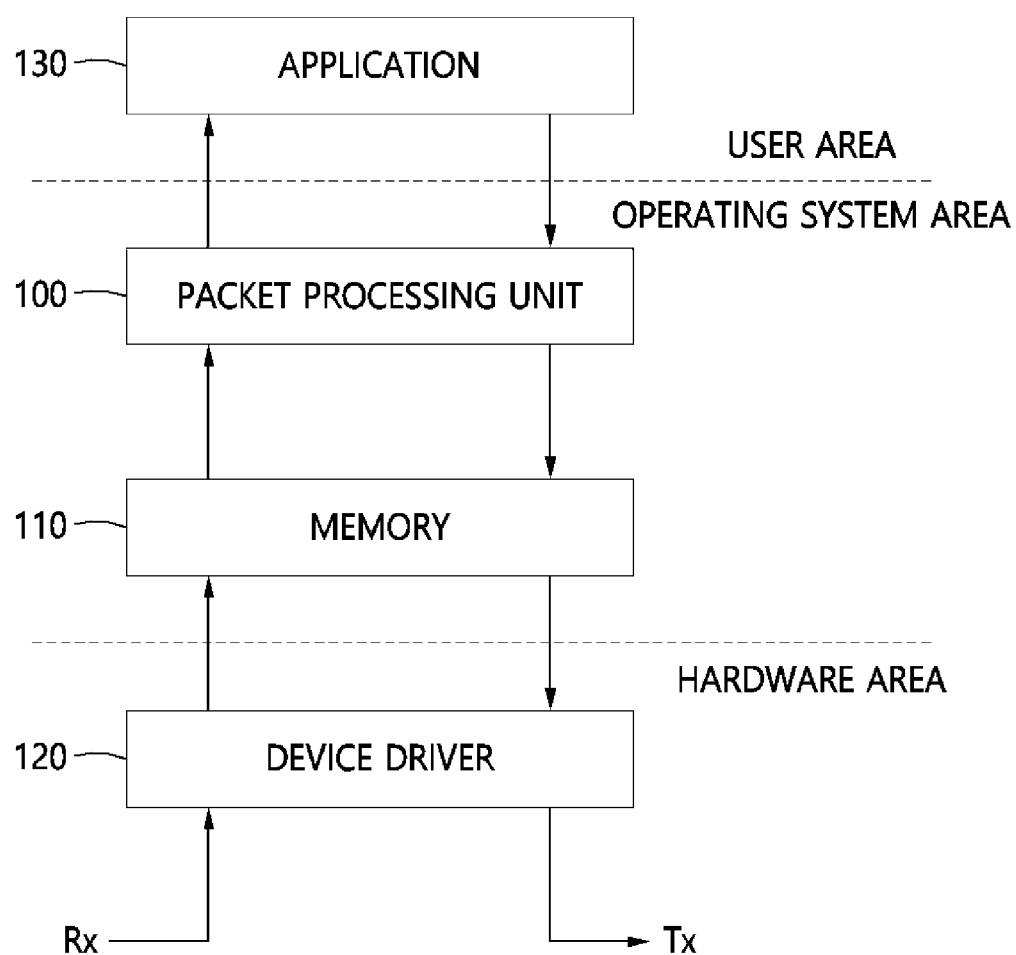
FIG. 1 is a block diagram schematically illustrating the function of a high-speed packet processing system.

The objectives, advantages, and novel features of the present invention will become more apparent from the detailed descriptions and preferred embodiments provided below in conjunction with the appended drawings. As regards the reference numerals assigned to the elements shown in the drawings, it should be noted that like numerals are used for like elements even when they appear in different drawings. Terms such as "one side", "the other side", "first", "second", etc., are used merely to differentiate one element from another; the elements are not to be limited by such terms.

In describing the present solution, certain descriptions of relevant known technology are omitted if it is deemed that such descriptions may unnecessarily obscure the essence of the present solution. In the descriptions, like reference numerals refer to like parts or materials even when the elements associated with the numerals belong to different embodiments.

A high-speed packet processing system will be described below in more detail with reference to the drawings. Here, a "packet" is a formatted block of data carried by a packet-switched computer network in information technology. A computer connection that does not support packets would transmit data continuously simply in the form of independent bytes, character strings, bits, etc., but if the data is altered in format to packets, a network can send long messages in a more effective and more reliable manner. A descriptor is a data structure that stores the storage device address, length, and status field of a packet.

Figure 2:
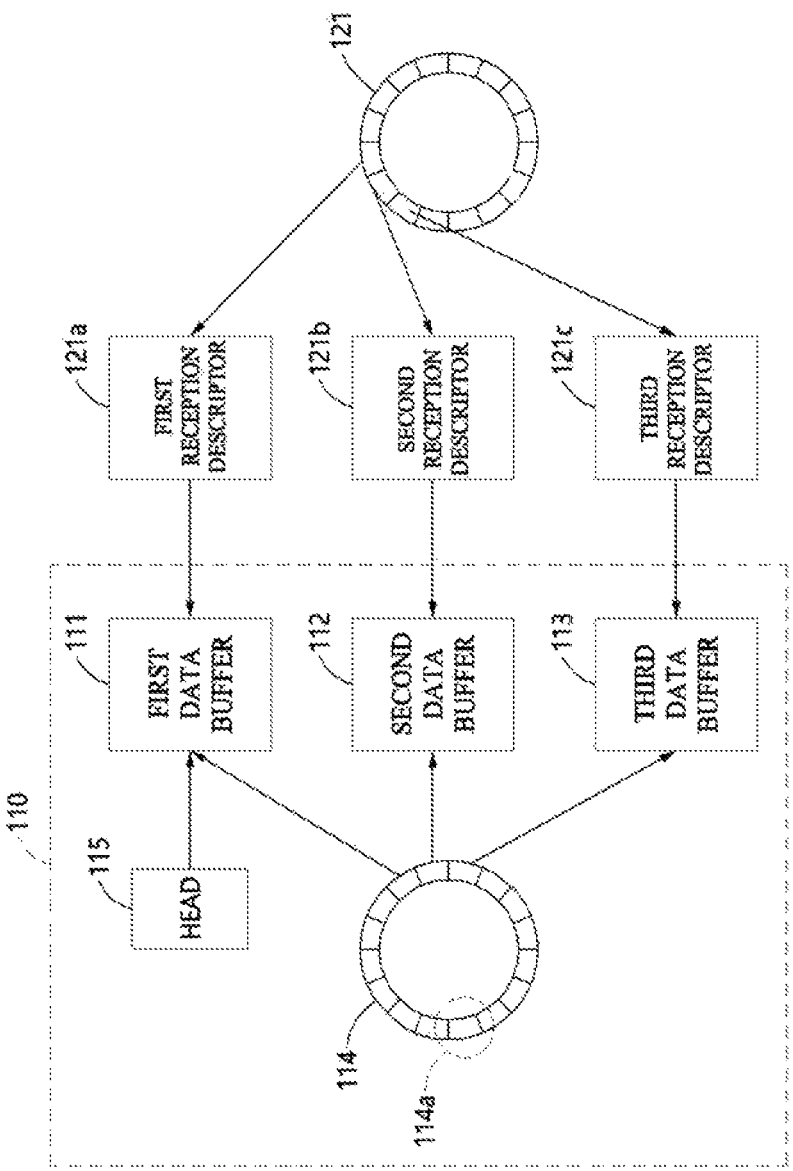
FIG. 2 illustrates a method of allocating memory in a high-speed packet processing system.
Figure 3:
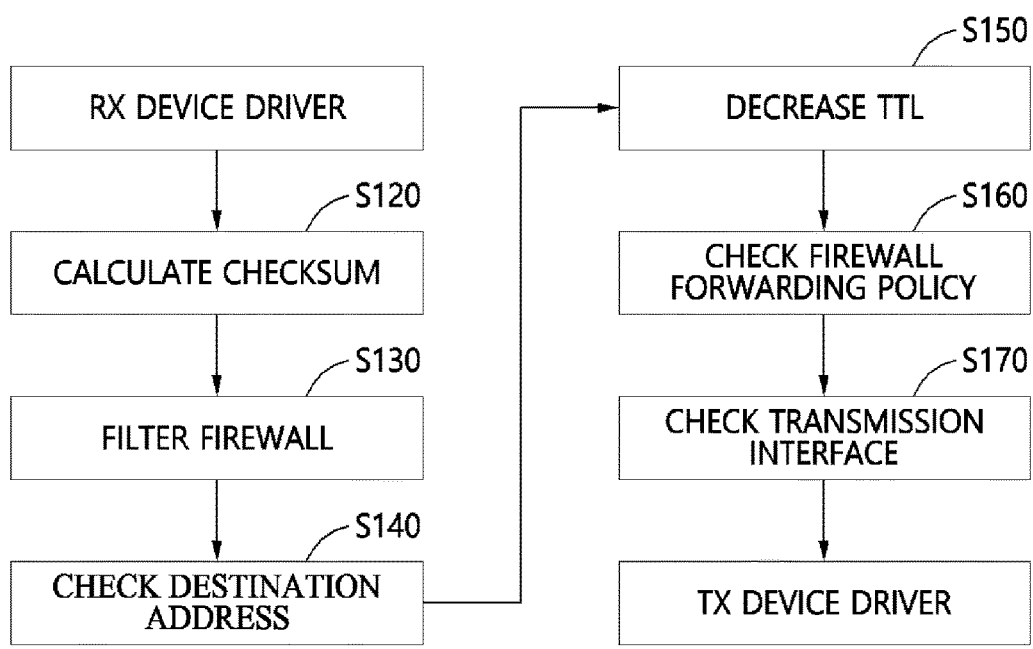
FIG. 3 illustrates the transfer path of a packet.
Figure 4:
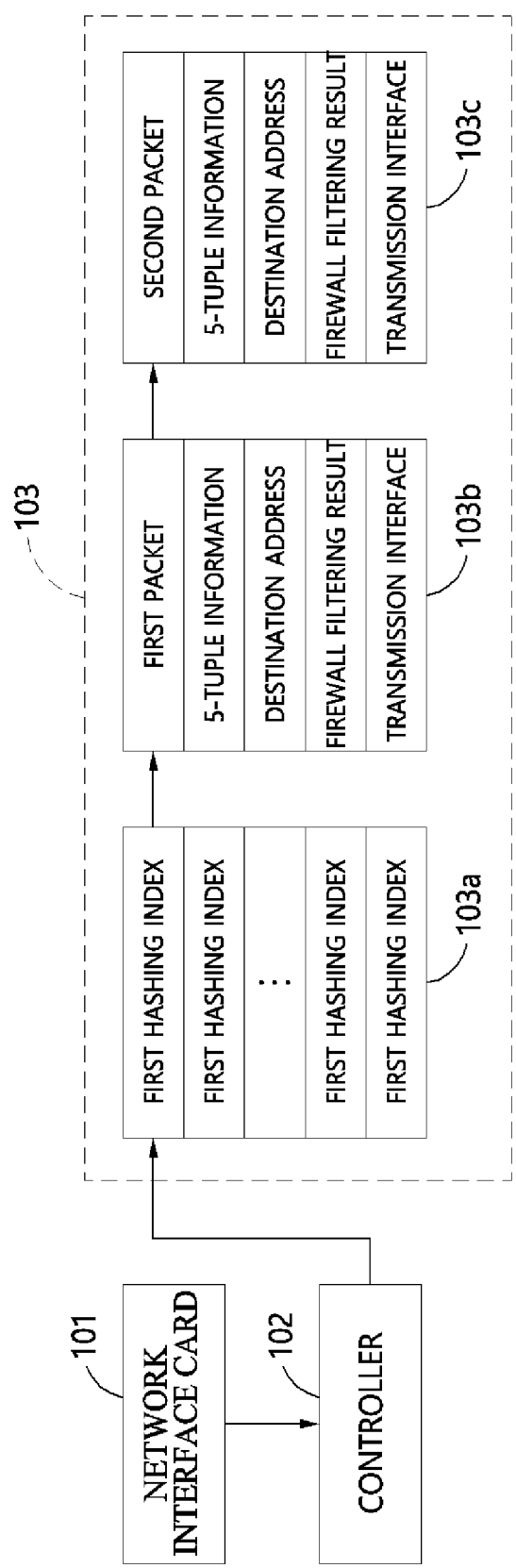
FIG. 4 illustrates the managing of packet information.

FIG. 1 is a block diagram schematically illustrating the function of a high-speed packet processing system, and FIG. 2 illustrates a method of allocating memory in a high-speed packet processing system. FIG. 3 illustrates the transfer path of a packet, and FIG. 4 illustrates the managing of packet information.

As illustrated in FIG. 1, a high-speed packet processing system may include a network interface card (NIC) or a device driver 120 for the network interface card (hereinafter referred to as NIC device driver), a memory 110 associated with transmitted or received packets, and a packet processing unit 100 for storing the packets in the memory 110. Here, the description that the high-speed packet processing system includes the device driver 120 encompasses the meaning that it includes components (possible named a device driver module, etc.) for performing the operation of the device driver 120.

The network interface card (NIC), commonly referred to as a LAN card in the Republic of Korea, is a type of hardware used for communication between computers in a computer network. The network interface card (NIC) entails OSI layer 1 (physical layer) and layer 2 (data link layer) and uses MAC addresses to provide a low-level address allocation system and enables physical access as a network medium.

Users can access a network by way of a cable connection or wireless connection, and the device driver 120 of the network interface card can include a reception (Rx) driver (not shown) for receiving packets and a transmission (Tx) driver (not shown) for transmitting the packets after processing by an application 130 in the user area. However, in some scenarios, the packet processing operation is performed in the operating system area, not the application 130, to enable faster completion of the packet processing operation. Here, the operating system area can be used with a meaning identical or similar to the kernel area.

The memory 110 may be arranged in the operating system area, and may include at least one or more data buffers 111-113, which are pre-allocated in correspondence to the packets so that the packets can be stored therein, and a single dedicated head (dedicated skb) 115, which is decoupled from the data buffers 111-113 and is connected sequentially with the data buffers 111-113 in correspondence to the packets. Here, 'skb' is a data structure for packets used in an operating system and is decoupled from the data buffers 111-113 that store the information of the packets. Also, the description that the memory 110 may be arranged in the operating system area encompasses the meaning that the configuration is implemented such that the operating system or the kernel is able to access the memory 110.

The memory 110 may further include a data buffer queue 114 that corresponds with each of the data buffers 111-113 and comprises at least one or more data buffer descriptors 114a capable of holding the allocated DMA (dynamic memory allocation) addresses and the virtual addresses of the data buffers 111-113.

Here, the data buffer descriptor 114a can hold the DMA address and virtual address of each data buffer 111-113 and may be inserted into a data buffer queue 114 having the form of a circular queue.

The packet processing unit 100 may connect (or map) the single dedicated head (dedicated skb) to the data buffers 111-113 sequentially when packets are received, and based on reception (Rx) descriptors 121a-121c corresponding to the packets, may store the packets sequentially in the data buffers 111-113 corresponding to the reception (Rx) descriptors 121a-121c. Here, data buffers 111-113 may store the DMA addresses where the actual packets are stored, and when the processing of the packets is completed, the packet processing unit 100 may disconnect (or erase) the mapping between the data buffers 111-113 and their corresponding DMA addresses.

That is, unlike the existing method of allocating memory 110 whenever a packet is received, the data buffers 111-113 for storing the packets may be allocated beforehand, and the packet information may be stored in the pre-allocated data buffers 111-113, as illustrated in FIG. 2. The central processing unit (CPU) may have a data buffer queue 114 designated for each core, with the received packets processed by a dedicated head 115 sequentially pointing to several data buffers 111-113 (high-speed memory allocation).

When packets are received, the packet processing unit 100 may allocate to the single head 115 the virtual addresses of the data buffers 111-113 where the packets are to be stored, thereby sequentially connecting the single head 115 with the first data buffer 111, second data buffer 112, and third data buffer 113.

Also, upon receiving a function call from the reception (Rx) driver, the packet processing unit 100 can sequentially perform the processes of calculating a checksum (ip_checksum), firewall filtering (firewall_pre_routing), checking the destination address (ip_route_lookup), decreasing the TTL (time to live) (decrease_TTL), checking the firewall forwarding policy (firewall_forward), and checking the transmission interface (neighbor_lookup), for the packets (high-speed packet transfer path).

That is, the packet processing unit 100, following the RFC 1812 standard for packet processing, can perform the steps of calculating the checksum of the packets (S120), filtering the firewall (S130), checking the destination address of the packets (S140), decreasing the TTL (time to live) (S150), checking the firewall forwarding policy (S160), and checking the transmission (Tx) interface (S180), as illustrated in FIG. 3. The steps described above can be implemented in the form of function pointers, so that functions may readily be added or removed as necessary if additional operations are required.

In order to avoid lowered performance, it is desirable that the steps above be performed efficiently. In a multi-core environment, each core of the controller 102 (CPU) can manage variables to prevent performance degradation caused by a spinlock, and each core of the controller 102 (CPU) can store different variables in the cache, so as to prevent the problem of 'false sharing', which otherwise may easily occur in a multi-core environment.

However, the steps of filtering the firewall (S130), checking the destination address of the packets (S140), etc., are such that can be applied to several packets at once. For example, when packets having the same destination address are received consecutively, it would be inefficient to perform the step of checking the destination address of the packet (S140) for each of the packets.

Therefore, as illustrated in FIG. 4, the packet processing unit 100 can include a packet information manager database 103, which includes a hashing table 103a composed of first hashing indexes that are obtained as results of hashing the 5-tuple information for the packets and packet data 103b, 103c that is linked in a chain format to the first hashing indexes, and a controller 102, which compares second hashing indexes transmitted from the network interface card 101 with the first hashing indexes in the hashing table 103a of the packet information manager database 103 and applies the packet data 103b, 103c linked with the first hashing index to a packet if the first hashing index is identical to the second hashing index. The network interface card 101 can hash the 5-tuple information for each of the received packets to calculate and output the second hashing index corresponding to each of the packets.

Here, the 5-tuple information of a packet can include the source and destination addresses of the packets, the source and destination port numbers, and L4 protocol identifiers, but since the hashing value of the 5-tuple information may be calculated and returned at the network interface card 101 by hardware means, there is no separate processing needed for hashing. While the packet data 103b, 103c can include information on the destination address, the results of firewall filtering, the transmission interface, etc., but the present solution is not thus limited.

The network interface card 101 and the controller 102 can include algorithms for performing the functions described above and can be implemented in firmware, software, or hardware (for example, a semiconductor chip or an application-specific integrated circuit).

While the spirit of the invention has been described in detail with reference to specific embodiments, the embodiments are for illustrative purposes only and do not limit the invention. It is to be appreciated that those skilled in the art can change or modify the embodiments without departing from the scope and spirit of the invention.

Simple variations or modifications of the present invention remain within the scope of the present invention, which is defined by the scope of claims set forth below.

What is claimed is:

1. A high-speed packet processing system comprising:
a network interface card configured to receive or transmit packets;
a memory accessible by an operating system, the memory comprising at least one or more data buffers and a single dedicated head (dedicated skb) decoupled from the data buffers, the data buffers pre-allocated in correspondence to the packets to allow storing of the packets, the single dedicated head connected to the data buffers sequentially in correspondence to the packets; and
a packet processing unit, comprising a processor, configured to sequentially connect the single dedicated head with the data buffers and store the packets sequentially in the data buffers corresponding to reception (Rx) descriptors based on the reception (Rx) descriptors designated in correspondence to the packets, when the packets are received.

2. The high-speed packet processing system of claim 1, wherein the memory further comprises a data buffer queue corresponding to the data buffers, the data buffer queue comprising at least one or more data buffer descriptors, the data buffer descriptor capable of holding an allotted DMA (dynamic memory allocation) address and a virtual address of the data buffer.

3. The high-speed packet processing system of claim 2, wherein the data buffer queue has a form of a circular queue, and the data buffer descriptors are inserted into the circular queue.

4. The high-speed packet processing system of claim 3, wherein the packet processing unit performs processes of calculating a checksum, filtering a firewall, checking a destination address, decreasing a TTL (time to live), checking a firewall forwarding policy, and checking a transmission interface for the packets upon receiving a function call from a reception (Rx) driver.

5. The high-speed packet processing system of claim 4, wherein the packet processing unit comprises:
a packet information manager database comprising a hashing table and packet data, the hashing table listing a first hashing index obtained as a result of hashing 5-tuple information for a packet, the packet data linked in a chain format to the first hashing index; and
a controller configured to compare a second hashing index transmitted from the network interface card with the first hashing index and apply the packet data linked to the first hashing index if the first hashing index and the second hashing index are identical, and wherein the network interface card calculates the second hashing index corresponding to each of the packets by hashing the 5-tuple information for each of the packets.

6. A method of controlling a high-speed packet processing system, the method comprising:
a first step of receiving packets by way of a network interface card; and
a second step of storing the packets sequentially in at least one or more pre-allocated data buffers in correspondence to the packets in an operating system area by way of a packet processing unit, the at least one or more data buffers forming a memory.

7. The method of claim 6, wherein the second step comprises:
sequentially connecting the at least one or more data buffers corresponding to the packets to a single dedicated head, when the packets are received; and
sequentially storing the packets based on reception (Rx) descriptors corresponding to the packets by storing the packets in the data buffers corresponding to the reception (Rx) descriptors.

8. The method of claim 7, further comprising:
calculating a checksum for the packets;
filtering a firewall;
checking a destination address of the packets;
decreasing a TTL (time to live);
checking a firewall forwarding policy; and
checking a transmission interface.

9. The method of claim 8, wherein the step of checking the destination address of the packets comprises:
calculating a second hashing index corresponding to each of the packets by hashing 5-tuple information for each of the packets, the calculating performed by a network interface card; and
comparing the second hashing index transmitted from the network interface card with a first hashing index from a hashing table stored in a packet information manager database, and applying packet data linked to the first hashing index if the first hashing index and the second hashing index are identical, the comparing and the applying performed by a controller.

* * * * *